United States Patent [19]
Elliott et al.

[11] 4,283,122
[45] Aug. 11, 1981

[54] LIGHT-BEAM STREAKING EMPLOYING CRYSTAL WITH TRAVELING LENS AND MULTIPLE CROSS-CRYSTAL REFLECTIONS

[75] Inventors: Richard A. Elliott, Beaverton; Gail A. Massey, Cornelius; John B. Shaw, Aloha, all of Oreg.

[73] Assignee: Oregon Graduate Center for Study and Research, Beaverton, Oreg.

[21] Appl. No.: 89,083

[22] Filed: Oct. 29, 1979

[51] Int. Cl.³ ............................................. G02F 1/29
[52] U.S. Cl. .................................... 350/379; 350/381
[58] Field of Search .............................. 350/149–150, 350/371, 379, 381

[56] References Cited
U.S. PATENT DOCUMENTS

| 3,432,222 | 3/1969 | Fleisher et al. | 350/149 |
| 4,053,763 | 10/1977 | Harney | 350/150 |

OTHER PUBLICATIONS

Massey et al. "An Electro-Optic Technique for Display & Shaping of Subnonosecond Laser Pulses," App. Phys. Letters vol. 29, 12-15-1976, pp. 802-804.

*Primary Examiner*—William H. Punter
*Attorney, Agent, or Firm*—Kolisch, Hartwell & Dickinson

[57] ABSTRACT

Apparatus for streaking a beam of light employing a crystal in which an electromagnetic wave pulse induces a synthesized traveling lens. Surfaces on opposite sides of the crystal act as light reflectors to create multiple cross-reflections of the beam relative to the crystal, thus to enhance the lensing effect of the crystal. Production of the electromagnetic wave pulse is coordinated with impingement of a beam of light, and the geometry of parts is arranged whereby each coherent wave front in the beam, as it passes multiple times through the crystal, on each such passing encounters the same substantially constant lens condition which has been induced in the crystal.

2 Claims, 6 Drawing Figures

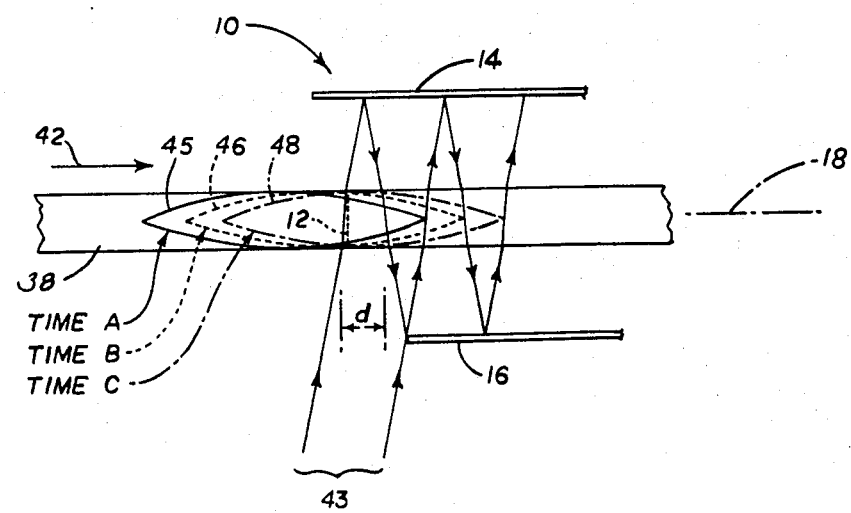
FIG. 4.
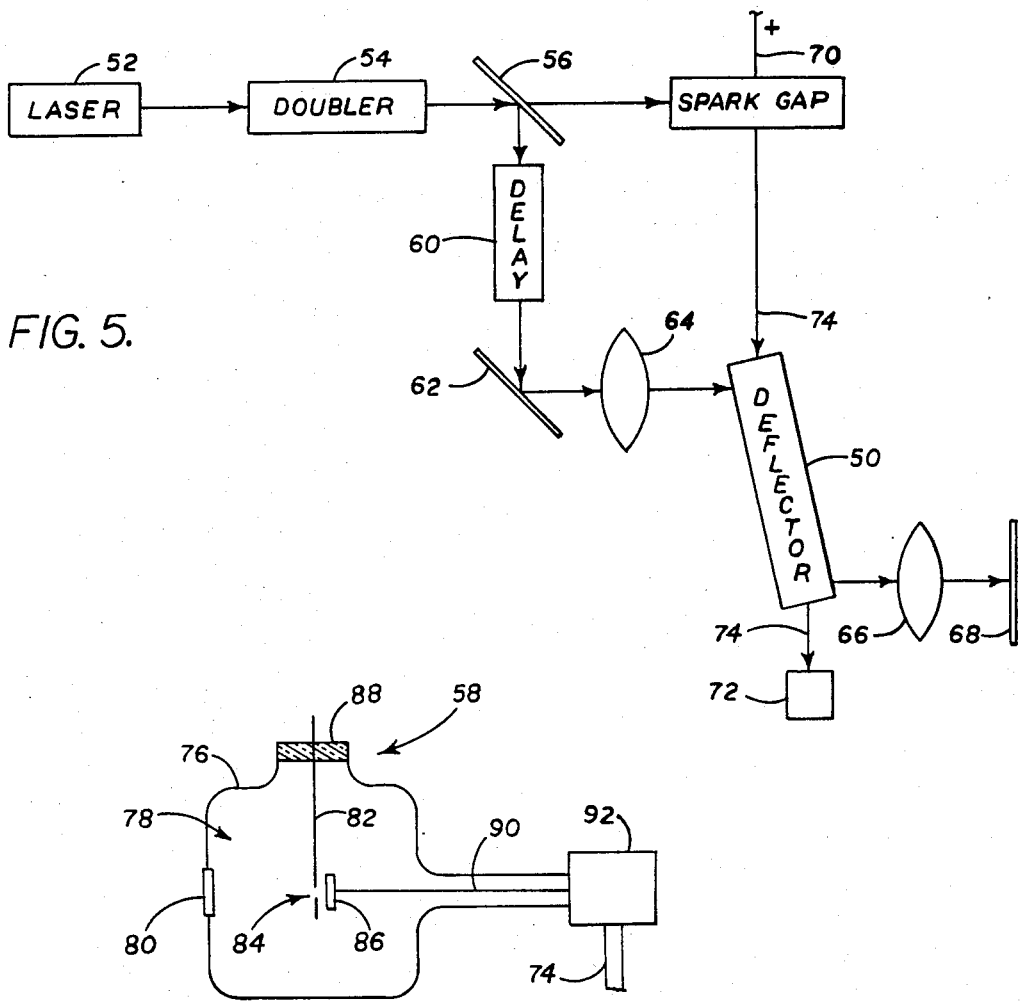
FIG. 5.
FIG. 6.

LIGHT-BEAM STREAKING EMPLOYING CRYSTAL WITH TRAVELING LENS AND MULTIPLE CROSS-CRYSTAL REFLECTIONS

BACKGROUND AND SUMMARY OF THE INVENTION

This invention pertains to apparatus for monitoring high-speed (subnanosecond) phenomena, through modulating, streaking, and recording over time the path of a light beam. More particularly, it pertains to a portion of such apparatus which employs, in a crystal, an electro-optically induced traveling lens which is caused to interact with multiple passes of the beam of light as the same travels through the crystal.

There are many applications, in modern physics and industry, where it is important to be able to detect, monitor and record accurately extremely high-speed events. Over the years, progressively more sophisticated techniques and apparatus have been developed for increasing time resolution, thus to enable "capture" of such events. One of the most current of these techniques involves the voltage-inducement, in certain optically transparent crystals, of a synthesized traveling lens, which, as it travels, causes a short-duration burst of light, as from a laser, to be swept along a defined path. The swept light beam is projected onto an optically sensitive film, and information, as from a high-speed event, is used to modulate the intensity of the beam so as to produce a readable indication in the filmed event. As is well known, the voltage which exists across such a crystal affects its refractive index. By using a substantially parabolic, short-duration voltage pulse, which pulse travels in conductors distributed along the opposite sides of such a crystal, there results a traveling refractive index effect (traveling nearly at the speed of light in the crystal) that has been shown to be effective in sweeping or streaking a light beam. In effect, such a pulse induces in the crystal a synthesized traveling lens.

As a result of ongoing concern for improving even further the time resolution obtainable with such a technique, we have devised a significant improvement in such apparatus, which improvement appreciably increases the effective bandwidth of such apparatus, and greatly improves time resolution. In particular, proposed by the present invention is a modification wherein multiple cross reflections for a light beam are created in an elongated crystal. These reflections are coordinated with the traveling lens, so that each coherent wave front in the beam not only traverses the crystal multiple times, but also for each crossing passes through substantially the same "lens portion". As a consequence of this kind of activity, each wave front in a beam experiences what might be thought of as a multiplied lens effect—namely one which is multipled by the number of passes through the traveling lens. Thus, focusing is greatly enhanced, and a significantly higher time resolution is possible, which means that significantly shorter-duration events can be monitored accurately. Put another way, enhanced focusing increases the number of resolvable points in a recorded trace of a swept light beam.

By featuring the multiple-reflection activity just outlined, other important advantages are attained. For example, it is a relatively simple matter to couple, endo, plural elongated crystals, thus to increase the number of cross reflections which are possible—thereby further increasing the lensing effect. The sizes of such crystals, and the geometry of the overall apparatus, are easily controlled so that the regions of abutment or joinder between adjacent crystals produce no optical errors. Further, the multiple cross-reflection technique tends to minimize the effect on the finally streaked light beam of local imperfections that exist within the body of a crystal.

Another important advantage of the multiple cross-reflection technique is that the overall electrical impedance of the assembly formed by such a crystal, and by the conductors sandwiched therewith, can be maintained at a maximum level. Further explaining, it would be possible, without using multiple cross-reflections, to achieve enhanced focusing simply by increasing the single-pass-through distance in a crystal that a light beam travels before emerging. However, by enlarging crystal depth to accomplish this, the impedance of a crystal-conductor assembly would be extremely low, and this could present a serious problem in "loading" excessively whatever source is used to generate the required voltage pulse. Such loading is minimized by minimizing crystal dimension in the direction of light travel, while at the same time providing for multiple passes through the crystal, thus to increase the "effective" distance through which a light beam travels in the crystal.

One embodiment of the proposed invention is described wherein reflections are produced through the actions of opposing mirrors disposed adjacent a pair of outside opposite faces in a crystal. In another modification which is mentioned briefly herein, advantage is taken of what is known as the critical reflection angle in the crystal—namely that angle of total internal reflection—where outside mirrored surfaces are not required.

These and other objects and advantages obtained by the present invention will become more fully apparent as the description which now follows is read in conjunction with the accompanying drawings.

DESCRIPTION OF DRAWINGS

FIG. 4 is an enlarged fragmentary view, similar to a portion of FIG. 1, illustrating multiple-reflection activity produced in the apparatus of FIGS. 1 and 2.

FIG. 5 is a schematic view illustrating an arrangement of components connected for use in cooperation with apparatus like that shown in FIGS. 1 and 2.

FIG. 6 is a simplified schematic drawing of a spark gap device used in the arrangement of FIG. 5.

DETAILED DESCRIPTION OF THE INVENTION

Figure 1:
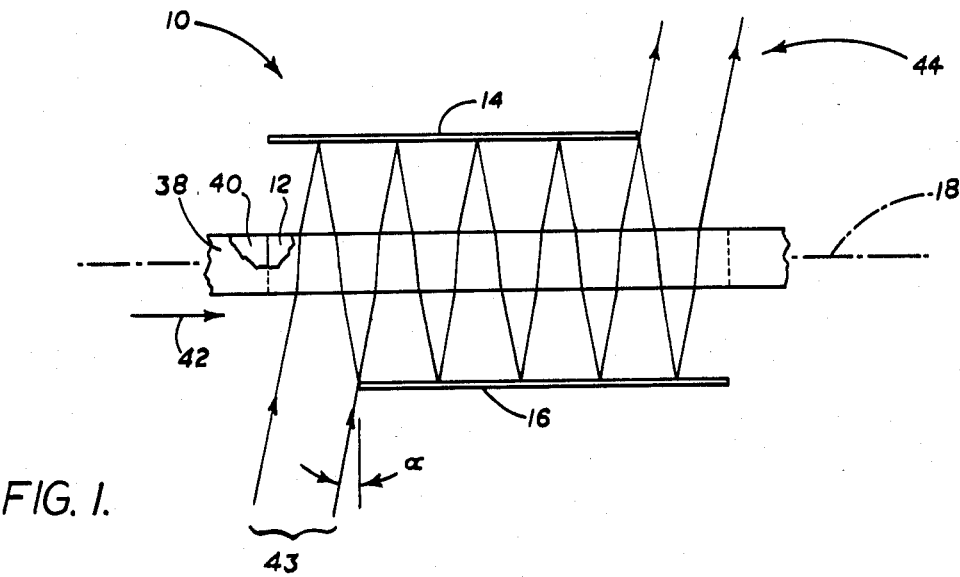
FIG. 1 is a simplified schematic view illustrating one embodiment of a portion of light-beam-streaking apparatus constructed in accordance with the present invention.
Figure 2:
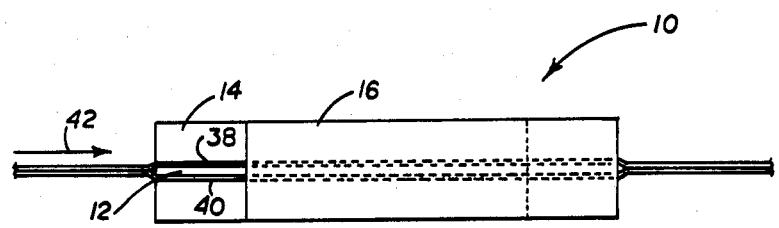
FIG. 2 is a view taken from the bottom of FIG. 1.

Turning now to the drawings, and referring first to FIGS. 1 and 2, indicated generally at 10 is one embodiment of a lens device, also referred to herein as a deflector, constructed in accordance with the present invention. Device 10 includes an elongated slender crystal 12, on one set of opposite sides in which are two confronting, longitudinally offset mirrors 14, 16.

FIG. 1 may be thought of as a plan view of device 10, and as seen therein, crystal 12 has a length of about 70-millimeters, and a width (its vertical dimension in FIG. 1) of about 10-millimeters. The thickness of the crystal, appearing as its vertical dimension in FIG. 2, is about 2-millimeters. Crystal 12 herein is formed of potassium-dideuterium-phosphate. The longitudinal axis of the crystal, shown by dash-dot line 18 (see FIG. 1), is also referred to herein as a lens-traveling axis.

Mirrors 14, 16, also referred to herein as reflector means having reflective surfaces, and as path-defining means, are parallel planar mirrors formed in any suitable manner. Each mirror has a length of about 60-millimeters, and a width (shown as the vertical dimension for the mirrors in FIG. 2) suitable to span the 2-millimeter thickness of crystal 12. The mirrors are longitudinally offset as shown, with the left end of mirror 14 being substantially longitudinally in line with the left end of crystal 12 in the figures, and with the right end of mirror 16 in the figures being substantially longitudinally aligned with the right end of the crystal in the figures. Such offsetting of the mirrors creates what may be thought of as a pair of access windows for the crystal—one of these facing downwardly in FIG. 1 (toward the viewer in FIG. 2), and the other facing upwardly in FIG. 1 (away from the viewer in FIG. 2). It should be pointed out that while it is convenient to have these two "windows" disposed on opposite sides of crystal 12, such disposition is neither necessary nor critical.

It is a well known fact, utilizing a crystal such as crystal 12, oriented properly with respect to a beam of light which has a particular polarization, one can synthesize a high-speed translating lens, through passing a high-intensity short-duration voltage pulse along a pair of conductors distributed along opposite sides of the crystal. Such a pulse causes what might be thought of as a refractive index change wave to propagate along the crystal, with the consequence that a beam of light, of the type just generally mentioned, aimed substantially across the path of propagation of the pulse, is swept, or streaked, through a predetermined angle where it emerges from the crystal. An article fully detailing and describing this electro-optical phenomena appears, under the title "An Electro-Optic Technique for Display and Shaping of Subnanosecond Laser Pulses" in Applied Physics Letters, Vol. 29, No. 12, 15 December 1976.

Figure 3:
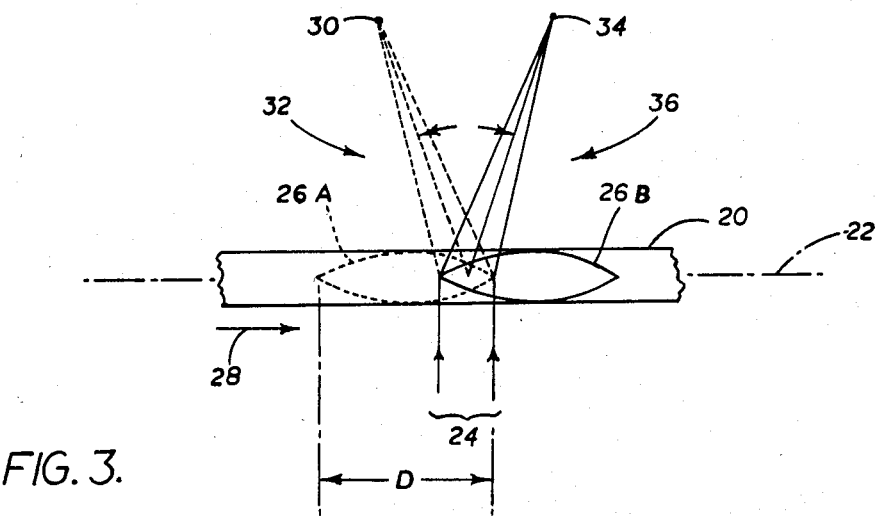
FIG. 3 is a simplified schematic view illustrating one of the underlying operating principles employed in the apparatus of FIGS. 1 and 2.

While the above-mentioned article will provide the reader with a thorough analysis of the underlying electro-optical effect employed by the apparatus of the invention, a brief description of such effect is now given, with particular reference to FIG. 3. Thus, and turning to this figure, indicated at 20 is a fragment of an elongated crystal formed of the same material which makes up crystal 12. The longitudinal axis of crystal 20 is shown by dash-dot line 22. By a suitable means, the construction of which is not important to an understanding of FIG. 3, a shortduration (approximately 1-nanosecond) voltage pulse is propagated along conductors which are distributed on the near and far sides of crystal 20 in FIG. 3. Ideally, this pulse takes the form, in time, of a parabola. The two bracketed lines, designated 24, represent a properly polarized beam of light from a laser. And, let us assume that the beam of light actually takes the form of a pulse or burst of light having substantially the same duration in time which is required for the voltage pulse to travel on the conductors completely past the point of light beam impingement with the crystal. Techniques for correlating these time durations, and further for ynchronizing initiation of the light burst with arrival of the voltage pulse, are well within the knowledge and capabilities of those skilled in the art. Refer again, for example, to the above-mentioned publication.

Represented in FIG. 3, in dashed lines at 26A, is a lens which is formed in crystal 20 as a consequence of the presence in the conductors mentioned of a short-duration propagating voltage pulse. The propagation direction of the pulse is indicated by arrow 28, and its physical length, relative to the long axis of crystal 20, is indicated by dimension D. Assuming that the pulse is indeed parabolic, adjacent its opposite ends relative to the crystal, it produces only minor changes in the refractive index of the crystal. Progressing inwardly on the pulse from its opposite ends (relative to the crystal), it produces progressively greater refractive index changes, and as a consequence, induces a lens in the crystal which can be represented as indicated by dashed lines 26A.

The point in time chosen for illustration of the lens represented by lines 26A is that point where the lens has traveled in the crystal to a location where it first completely intercepts the totality of light beam 24. With such interception, the lens focuses this beam at point 30, which is at the terminus of the dashed focus lines generally indicated at 32. As the lens then continues to travel in the direction of arrow 28, the focal point of the beam is swept to the right in FIG. 3, toward point 34 which is at the terminus of the focusing lines shown generally in solid outline at 36. Focusing at point 34 occurs when what might be thought of as the trailing edge of the lens (the lens now being shown in solid outline at 26B) just barely completely intercepts beam 24.

Thus, the electro-optic effect which is produced results in sweeping or streaking of the focal point of beam 24 over a line extending between points 30, 34. Such a beam, if of the proper wavelength, can be directed onto a film strip or the like for permanent recording. And, with proper synchronization between the burst of light which produces the beam, and the voltage pulse which produces the traveling lens, any information which may be carried in the beam, as by intensity modulation of the beam, is displayed in a time-base display as a consequence of the recorded sweep on a film between points 30, 34. It is this electro-optic effect, then, on which the apparatus of the present invention is based.

Returning to FIGS. 1 and 2, indicated at 38, 40 are two insulated, thin-ribbon conductors which lie in coplanar adjacency, except where they extend, as shown, closely over the top and bottom sides of crystal 12. These conductors are referred to herein as an electromagnetic wave-producing means. The left ends of the conductors in FIGS. 1 and 2 extend to a suitable source (which will be described shortly) that produces a short-duration voltage pulse. The right ends of the conductors extend a short distance past the crystal to a suitable terminating resistor (not shown). When a voltage pulse is introduced to these conductors it travels therealong, and past the crystal, in the direction of arrow 42.

Considering now FIGS. 1, 2, and 4 together, with crystal 12 dimensioned as described, and with mirrors 14, 16 positioned as illustrated and described, experience has shown that a satisfactory light beam has a generally ovate cross-sectional configuration, with a width of about 14-millimeters and a height of about 4-millimeters. Further, the beam is projected toward the aperture for the crystal defined on the lower side of FIG. 1 (and toward the viewer in FIG. 2), with the axis of the beam disposed at a slight angle (represented at α in FIG. 1) relative to a line normal to axis 18. A suitable angle in the apparatus now being described has been found to be approximately 10°. The angular orientation of the crystal about its axis relative to this aperture is such that the long axis of the beam's cross section lies in substantially the same plane as the crystal. In other words, it is intended that the ovate cross-sectional configuration for the beam substantially flood the entirety of the exposed aperture for the crystal. It will be apparent how, with the dimensions given for the aperture and for the beam, such occurs.

Looking now for a moment particularly at FIG. 1, and assuming that a light beam 43 is so projected at what will now be referred to as the entrance aperture for crystal 12, it will be seen that the beam passes closely adjacent, but misses, the left end of mirror 16. What then occurs will be immediately apparent. The beam passes through the crystal, strikes mirror 14, and is reflected back through the crystal toward mirror 16. Thus, and depending upon the specific dimensions and geometry which are provided for crystal 12, and for the two mirrors, the latter cause the light beam to be cross reflected multiple times through the crystal. In the particular illustration given in FIG. 1, mirrors 14, 16 produce eight reflections for a beam, with the same thus passing through the crystal nine times before exiting, as shown generally at 44, from the other aperture for the crystal, which will be called the exit aperture. The beams exits from the crystal along a path which is substantially parallel to the entrance path along which the beam impinges the crystal.

Directing attention now to FIG. 4, let us discuss how the apparatus of the invention operates to perform the multiple lensing action referred to earlier. The incident beam of light, throughout the time burst that defines it, may be thought of as being formed from a time continuum of successive coherent wave fronts—each arriving at the entry face, or entry aperture, of the crystal at a slightly different point in time. From the time that such a wave front strikes and enters the crystal, there is a finite time required for this front to pass through the crystal, be reflected by mirror 14, and return through the crystal. Looking at FIG. 4, and paying particular attention to the lines representing the reflected beam in the crystal, it is apparent that, due to the angular relationship between the axis of the beam and the axis of the crystal, each wave front, each time that it passes through the center of the crystal, and considering its succession of passages through the crystal, is progressively and uniformly displaced along the length of the crystal. The length of displacement between each pair of successive passages through the crystal is represented by the dimension "d" in FIG. 4.

The geometry of apparatus 10 has been selected whereby dimension "d" is equal to the distance that a voltage pulse which is traveling along conductors 38, 40 will cover in the time required for a given wave front to arrive twice in succession (and in reverse directions) at the center of the crystal.

Thus, let us assume that the time coordination between the initiation of a burst of light and the arrival of a traveling voltage pulse is such that the first wave front in the light beam makes its first passage through the center of the crystal at the same time that the voltage pulse induces in the crystal a lens in the position relative thereto represented by solid lines 45. We will refer to the time that this occurs as Time A. A consequence of the interaction between the first wave front and the leading edge, so-to-speak, of the traveling lens, is that the wave front is deflected toward a first virtual focusing point toward mirror 14. The wave front is then reflected by mirror 14, and when it returns to the central portion of crystal 12, the traveling lens will then be in the position shown by dashed lines 46. This occurs at Time B. It will be observed that the same first wave front then passes, in the reverse direction, through the identical portion of the lens which it first encountered on first crossing the crystal. Accordingly, the first wave front, in its then condition, is again similarly deflected, and further focused toward another virtual focusing point toward mirror 16. Carrying this explanation yet one step further, when the front has been twice reflected and returns to the central portion of the crystal—its third crossing of the crystal—the traveling lens will be in the position indicated by dash-dot line 48. This happens at Time C. Again, it will be noticed that the front encounters the same leading-edge portion of the lens, whereupon it is still further deflected toward yet another virtual focusing point. This same kind of encounter is repeated multiple times as the front progresses back and forth through the crystal until, after its final reflection from mirror 16, it emerges from the exit aperture for the crystal. The emergence condition is such that the originally entering beam is sharply focused, and is deflected toward one extreme of what may be thought of as a total deflection, or sweep, path for a beam.

After the first wave front has encountered the traveling lens, the "next" succeeding front will also encounter the lens, but at a slightly different location therein. This next front will experience exactly the same kind of repetitive interaction with the traveling lens as did the first front, except that the next front will, on each crossing with the crystal, interact with the lens at another unique portion within the lens. Such is true for the total time continuum of wave fronts which defines the overall burst of light. The last-to-be-received wave front which terminates the burst will, ideally, encounter the extreme trailing edge portion of the lens, and will be deflected in an opposite direction from the leading wave front, and toward the opposite end of the total deflection path which is capable of being produced by the apparatus.

Thus, with a construction like that shown in FIGS. 1, 2 and 4, the electro-optic focusing and sweeping effect attained by the predecessor structure, like that described in conjunction with FIG. 3, is "improved" multiple times by virtue of the multiple interactions which occurs for different wave fronts with different parts of a traveling lens. More particularly, a light beam is swept through a larger angle than is producible by apparatus such as that shown in FIG. 3. As a consequence, and because of enhanced focusing, short-term events which may be used, for example, to modulate the intensity of the burst of light will be readable with significantly more resolvable angular position, and will thus be recordable with appreciably higher time resolution.

Turning attention now to FIGS. 5 and 6, here there is shown an arrangement of devices and components which work together with the deflector of the invention. In FIG. 5 a deflector, such as that depicted in FIGS. 1, 2 and 4, is indicated at 50. A burst of light which is to impinge deflector 50 is generated, in the apparatus of FIG. 5, by a mode-locked neodymium: yttriumaluminum-garnet laser 52. Laser 52 is a commercially available device, and is fired to produce a time-defined burst of light in a conventional manner. In particular, the laser directs a beam of infrared radiation, having a wavelength of about $1.06 \times 10^{-6}$-meters, toward a potassium-dihydrogen-phosphate frequency doubler 54. Doubler 54 is also a conventional device, and functions to double the frequency of about 10% of the light radiation which strikes it. Thus, there emanates from doubler 54 both infrared radiation, and green radiation, with the latter having a wavelength of about $0.53 \times 10^{-6}$-meters. This combined radiation is directed toward a conventional dichroic mirror 56, which passes infrared radiation directly toward a spark gap device 58, while diverting the higher-frequency green radiation toward an optical delay system 60.

Device 58 will be described shortly. System 60 herein is a conventional arrangement of mirrors which add length to the overall travel path of the light directed toward it, thus to delay arrival of the light at its ultimate destination. Delayed light which emanates from system 60 is reflected by a mirror 62, and through a collimating lens 64, toward the entry aperture for the crystal in deflector 50. The exit aperture for the crystal in the deflector is aimed through a lens 66 toward a plate 68, which is intended to hold a suitable film strip. Completing a description of what is shown in FIG. 5, spark gap device 58 is supplied with high voltage through conductors represented by a line 70, and connects with a terminating resistor 72 through a pair of elongated ribbon conductors, like those mentioned earlier, which are represented by line 74. It will be appreciated that while line 74 in FIG. 5 is shown as a discontinuous line, it actually represents a continuous conductive path extending between the spark gap device and resistor 72, with the ribbon conductors which it symbolizes spreading to extend over and along the crystal in deflector 50.

FIG. 6 illustrates, in very simplified form, the structure of spark gap device 58, which also is a well-known and conventional type device. In particular, device 50 includes a conductive envelope 76 having a chamber 78 filled with nitrogen, pressurized to about 200 psi. At the left side of envelope 76 in FIG. 6 is an optically transparent window 80, positioned to receive infrared light which is transmitted through previously mentioned mirror 56.

Disposed optically in line to receive radiation thus transmitted through window 80 are a first electrode 82, having an aperture 84, and a target plate 86 which is exposed to radiation through this aperture. Electrode 82 extends outwardly of envelope 76 through an insulated support structure 88. On the outside of envelope 76, the envelope per se and electrode 82 are connected to the ground and high-voltage terminals, respectively, of a suitable high-voltage source, such as 20-kilovolt D.C. source.

Target 86 is connected through an electrode 90 with a junction block 92 which connects the envelope to one of the ribbon conductors previously mentioned, and electrode 90 to the other such conductor. These conductors are again represented at 74.

When a burst of light from the laser passes through window 80 and aperture 84 to strike target 86, photoemission takes place, with subsequent conduction to produce a voltage pulse across the ribbon conductors. This pulse lasts substantially the same length of time as the light burst.

Returning to FIG. 5, through relatively simply made adjustments in delay system 60. the arrival of the leading wave front of a burst of light directed toward the entrance aperture for deflector 50 is easily coordinated with arrival of the voltage pulse on the ribbon conductors. In particular, interactive action like that described in conjunction FIG. 4 is easily attained. Delay system 60, together with spark gap device 58, are referred to herein collectively as a coordinating means.

The apparatus is thus amply prepared to monitor, and to enable recording of, extremely short (subnanosecond) phenomena. Various different kinds of devices which can respond to short-term events may be introduced into the light path between laser 52 and deflector 50, to enable intensity-modulation of the laser beam. For example, one such device may take the form of a transparent vessel which contains an absorbing and fluorescing dye that is capable of responding to some outside short-term event. Conventional means are available for coordinating the occurrence of a to-be-monitored event, with a burst of light from the laser. With a film strip mounted on plate 68, a photographic record can be obtained from the swept beam which results from this activity, with changes in the intensity of the beam along the length of the film strip easily interpreted to produce a high degree of time resolution.

With a relatively long and thin crystal employed, the overall impedance of the crystal-conductor assembly is held to a maximum—thus avoiding excessive loading of the source that produces the traveling voltage pulse.

While one embodiment of the invention has thus been described, it is appreciated that there are a number of important variations which are possible. For example, one such modification takes the form of employing, as the crystal in a deflector, a lithium-niobate crystal which has a critical angle of total internal reflectance of around 27°. With this kind of a crystal, and with a light beam directed at an angle of around 30° from a line which is normal to the axis of the crystal, external reflective mirrors are not required. In other words, multiple cross-crystal reflections result naturally from internal reflectance activity.

Yet another modification which is possible, and which is especially permitted by utilizing the concept of multiple cross-crystal reflections, is that multiple crystals can be arranged end-to-end in a deflector to increase the total number of cross reflections which occur. This in turn further improves the resolution attainable by the apparatus. Through careful control of the sizing and geometry of such a system, cross reflections can be created which substantially completely ignore the presence or presences of end abutments between adjacent crystals.

Thus, there is proposed by the present invention a unique electro-optic apparatus for monitoring short-duration events. As has been pointed out hereinabove, modifications proposed by the invention over conventional apparatus significantly improve resolution performance as compared with the performances of prior art devices. While certain variations and modifications in the invention have been suggested and mentioned herein, it is appreciated that others are possible without departing from the scope of the invention.

It is claimed and desired to secure by Letters Patent:
1. Apparatus for streaking a beam of light comprising an electro-optic, electromagnetic-traveling-wave lens device having an elongated lens-traveling axis, said device being adapted to be impinged on a side and toward one end of said axis by a beam of light which is intended to be streaked, means operatively coupled to said device for producing thereadjacent, selectively, an electromagnetic wave which travels along said axis from its said one end toward the other end, thus to induce in the device a corresponding, synthesized traveling optical lens, reflector means including at least a pair of opposed, confronting reflective surfaces, disposed on opposite sides of said device in positions capable of producing, with respect to such impinging light beam, multiple cross-reflections through the device between said ends of said axis, whereby the beam impinging said device on a side thereof and adjacent said one end of said axis emerges on a side of said device adjacent said other end of said axis, said surfaces being oriented in such a manner that each wave front in the beam which is reflected by the surfaces successively crosses the axis of said device with a uniform displacement in time, between each crossing, which substantially equals the displacement in time, between such successive crossings, of said traveling lens in said device, and means responsive to the beam of light which impinges said device, operatively connected to said device for coordinating in time the production thereadjacent of the traveling electromagnetic wave with impingement of the device by the beam of light.

2. Apparatus for streaking a beam of light comprising an electro-optic, electromagnetic-traveling-wave lens device having an elongated lens-traveling axis, said device being adapted to be impinged on a side and toward one end of said axis by a beam of light which is intended to be streaked, means operatively coupled to said device for producing thereadjacent, selectively, an electromagnetic wave which travels along said axis from its said one end toward the other end, thus to induce in the device a corresponding, synthesized traveling optical lens, path-defining means responsive to the presence of an impinging light beam to create therefor multiple, generally reversely directed travel paths, each of which causes an interaction between the beam and said device, said path-defining means producing a time synchronization between the progress of each wave front in the reflected beam along said axis and the similar progress of said traveling lens, whereby such wave front passes through the same portion of said lens during travel along each travel path, and coordinating means operatively connected to said device for coordinating in time the production thereadjacent of the traveling electromagnetic wave with impingement of the device by the beam of light.

* * * * *